United States Patent
Xie

(10) Patent No.: US 9,626,829 B2
(45) Date of Patent: Apr. 18, 2017

(54) DATA PROCESSING DEVICE AND METHOD FOR INTERACTION DETECTION

(71) Applicant: Tencent Technology (Shenzhen) Company Limited, Shenzhen (CN)

(72) Inventor: Bo Xie, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 769 days.

(21) Appl. No.: 14/144,365

(22) Filed: Dec. 30, 2013

(65) Prior Publication Data

US 2014/0141876 A1 May 22, 2014

Related U.S. Application Data

(63) Continuation of application No. PCT/CN2013/087450, filed on Nov. 19, 2013.

(30) Foreign Application Priority Data

Nov. 22, 2012 (CN) .......................... 2012 1 0478541

(51) Int. Cl.
  *A63F 9/24* (2006.01)
  *G07F 17/32* (2006.01)
  *A63F 13/75* (2014.01)

(52) U.S. Cl.
  CPC .......... *G07F 17/3241* (2013.01); *A63F 13/75* (2014.09)

(58) Field of Classification Search
  CPC ....... A63F 13/12; A63F 13/75; G07F 17/3241
  (Continued)

(56) References Cited

U.S. PATENT DOCUMENTS

| 7,367,888 B1 * | 5/2008 | Chen ..................... A63F 13/12 463/1 |
| 8,622,837 B2 * | 1/2014 | Harris ..................... A63F 13/12 463/23 |

(Continued)

FOREIGN PATENT DOCUMENTS

| CN | 101304321 A | 11/2008 |
| CN | 101615305 A | 12/2009 |

(Continued)

OTHER PUBLICATIONS

Tencent Technology, ISRWO, PCT/CN2013/087450, Jan. 23, 2014, 7 pgs.

(Continued)

*Primary Examiner* — David L Lewis
*Assistant Examiner* — Robert Mosser
(74) *Attorney, Agent, or Firm* — Morgan, Lewis & Bockius LLP

(57) ABSTRACT

The current invention discloses devices and methods that may be used for detection and verification of interactions, such as collisions, between objects in application programs, such as online games. After receiving interaction information from a first terminal, a server may send the interaction information to another terminal for verification based on the first terminal's credit rating. When the credit rating is high, the server may broadcast the interaction information before the verification process, which may be conducted randomly. On the other hand, when the credit rating is low, the server may wait for the verification results from the other terminal and only broadcast the interaction information when the information is confirmed. Such an approach optimizes the interaction verification process, reduces security risk, and saves computing resources.

20 Claims, 7 Drawing Sheets

(58) Field of Classification Search
USPC .................. 709/238, 240; 463/29, 42, 43
See application file for complete search history.

(56) References Cited

U.S. PATENT DOCUMENTS

2005/0272492  A1    12/2005  Stelly, III
2008/0305869  A1    12/2008  Konforty et al.

FOREIGN PATENT DOCUMENTS

CN          102387547  A     3/2012
CN          102393826  A     3/2012
CN          102421151  A     4/2012
CN          102694580  A     9/2012

OTHER PUBLICATIONS

Tencent Technology, IPRP, PCT/CN2013/087450, May 26, 2015, 5 pgs.

* cited by examiner

DATA PROCESSING DEVICE AND METHOD FOR INTERACTION DETECTION

RELATED APPLICATIONS

This application is a continuation application of PCT Patent Application No. PCT/CN2013/087450, entitled "DATA PROCESSING DEVICE AND METHOD FOR INTERACTION DETECTION" filed Nov. 19, 2013, which claims priority to Chinese Patent Application No. 201210478541.6., "Data Processing Device and Method for Interaction Detection," filed on Nov. 22, 2012, both of which are hereby incorporated by reference in their entirety.

FIELD OF THE INVENTION

The present invention relates to the field of interaction detection, and in particular to data processing devices and methods for interaction detection.

BACKGROUND OF THE INVENTION

Sometimes it is necessary for a conventional server to process data generated by interactions, such as collisions, between objects in application programs, such as online games, installed in client terminals. For example, in some cases, the server needs to process collision data between interacting objects in the client terminal. During this process, the conventional server sometimes needs to detect interactions and determine whether interactions have occurred between the interacting objects.

With the conventional interaction detection technology, especially the collision detection technology, the server usually conducts the interaction detection to determine whether interaction has actually occurred using specific algorithms according to 2D (two-dimensional) or 3D (three-dimensional) model data of the interacting objects.

Nowadays, two types of conventional interaction detection technology are commonly used. The first is to implement the interaction detection at the client terminal and the server directly adopts the interaction detection results without further verification; the second is to conduct bounding box interaction detection in the server.

In the second implementation, the bounding box interaction detection conducted by the server usually consumes a great amount of CPU (central processing unit) resources through the interaction detection calculations, requiring excessive computing capability and making the cost of the server uneconomically high.

In order to reduce the data processing burden on the server, and to save server cost, the first technical implementation mentioned above may be utilized. However, such an approach may increase hidden security risks when the server directly adopts the interaction detection result performed by the client terminal without further verification.

Accordingly, it is necessary and desirable to provide a new technology, so as to resolve the technical problem and improve the above-mentioned approach.

SUMMARY

The above deficiencies and other problems associated with interaction detection and verification are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system may receive interaction information from a first terminal, wherein the interaction information is generated from an interaction of objects in a gaming application running on the first terminal. In addition, the computer system may determine a credit rating associated with the first terminal. If the credit rating associated with the first terminal exceeds a threshold, the computer system may broadcast the interaction information to other terminals running the gaming application; and if the interaction information satisfies a predefined condition: the computer system may send the interaction information to a second terminal for verifying the interaction information and downgrade the credit rating associated with the first terminal if the interaction information is not confirmed by the second terminal. If the credit rating associated with the first terminal does not exceed the threshold: the computer system may send the interaction information to the second terminal for verifying the interaction information; if the interaction information is confirmed by the second terminal, the computer system may broadcast the interaction information to the other terminals; and if the interaction information is not confirmed by the second terminal, the computer system may downgrade the credit rating associated with the first terminal.

Another aspect of the invention involves a computer system. The computer system may comprise one or more processors, memory, and one or more program modules stored in the memory and configured for execution by the one or more processors, the one or more program modules including: a communication module configured to receive interaction information from a first terminal, wherein the interaction information is generated from an interaction of objects in a gaming application running on the first terminal; a determining module configured to determine a credit rating associated with the first terminal; an interaction detection module configured to: if the credit rating associated with the first terminal exceeds a threshold: broadcast the interaction information to other terminals running the gaming application, and if the interaction information satisfies a predefined condition, send the interaction information to a second terminal for verifying the interaction information and downgrade the credit rating associated with the first terminal if the interaction information is not confirmed by the second terminal; and a data processing module configured to: if the credit rating associated with the first terminal does not exceed the threshold: send the interaction information to the second terminal for verifying the interaction information, if the interaction information is confirmed by the second terminal, broadcast the interaction information to the other terminals, and if the interaction information is not confirmed by the second terminal, downgrade the credit rating associated with the first terminal.

Another aspect of the invention involves a non-transitory computer readable storage medium having stored therein instructions, which, when executed by a computer system, cause the computer system to: receive interaction information from a first terminal, wherein the interaction information is generated from an interaction of objects in a gaming application running on the first terminal; determine a credit rating associated with the first terminal; if the credit rating associated with the first terminal exceeds a threshold: broadcast the interaction information to other terminals running the gaming application; and if the interaction information satisfies a predefined condition: send the interaction information to a second terminal for verifying the interaction information and downgrade the credit rating associated with the first terminal if the interaction information is not confirmed by the second terminal; if the credit rating associated with the first terminal does not exceed the threshold: send the interaction information to the second terminal for verifying the interaction information; if the interaction information is confirmed by the second terminal, broadcast the interaction information to the other terminals; and if the interaction information is not confirmed by the second terminal, downgrade the credit rating associated with the first terminal.

Some embodiments may be implemented on one or more computing devices in a network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
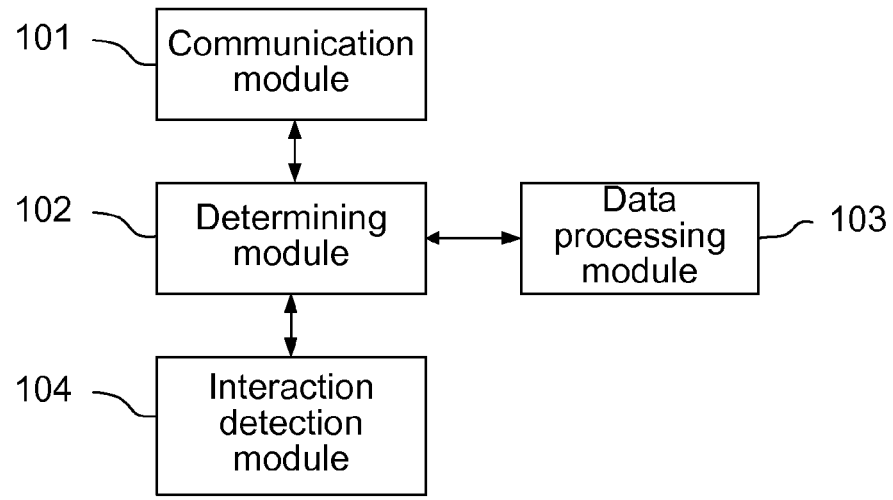
FIG. 1 is a block diagram illustrative of a computer system comprising modules configured to process interaction information in accordance with some embodiments of the current invention.

FIG. 1 is a block diagram illustrative of a computer system comprising modules configured to process interaction information in accordance with some embodiments of the current invention. Shown in FIG. 1 are a communication module 101, a determining module 102, a data processing module 103, and an interaction detection module 104.

Figure 4:
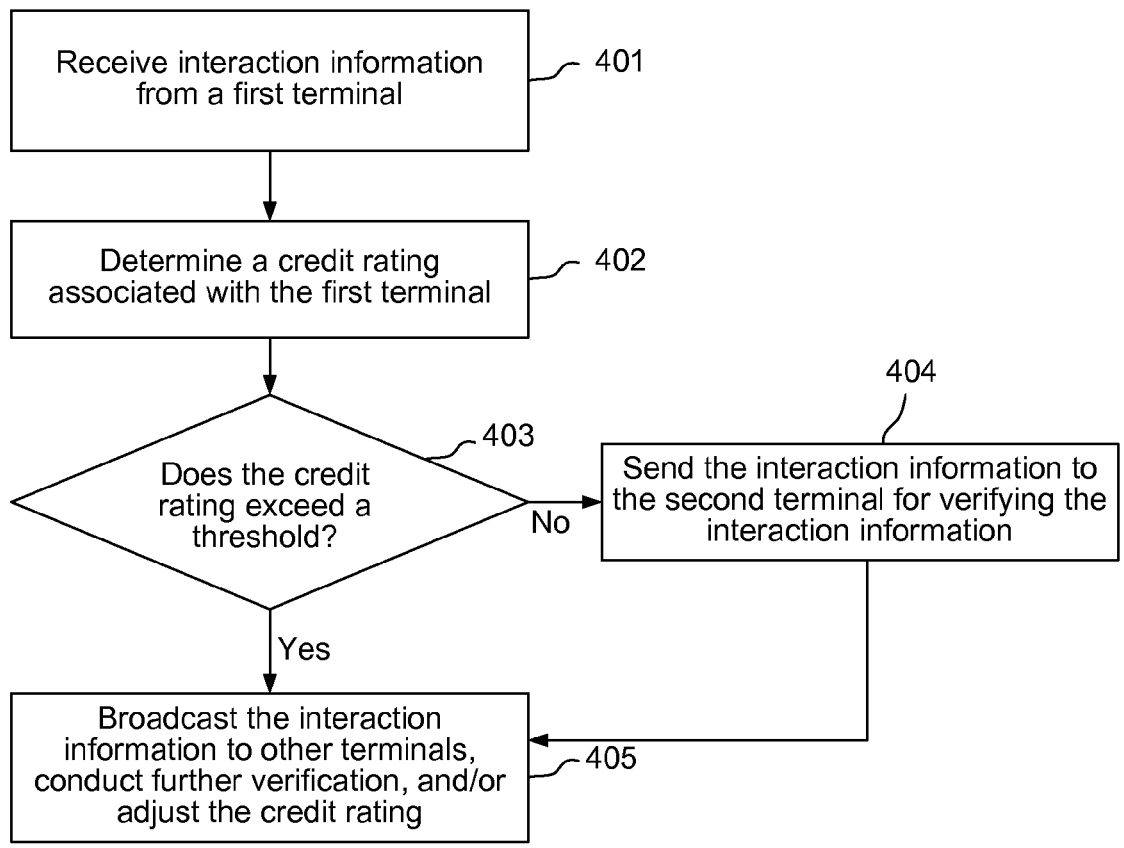
FIG. 4 is a flowchart illustrative of a method to process interaction information by a computer system in accordance with some embodiments of the current invention.

FIG. 4 is a flowchart illustrative of a method to process interaction information by a computer system in accordance with some embodiments of the current invention.

Referring to FIG. 4, step 401 shows that the computer system may receive interaction information from a first terminal. More particularly, as shown in FIG. 1, the communication module 101 may be configured to may receive interaction information from a first terminal. In some embodiments, the interaction information is generated from an interaction of objects in a gaming application running on the first terminal.

The computer system may be any computing device that has data processing capabilities, such as but not limited to: servers, workstations, personal computers such as laptops and desktops, and mobile devices such as smart phones and tablet computers. The computer system may also include multiple computing devices functionally integrated to process and verify interaction information. The terminals may also be any devices that may be used to run application programs, such as online games. It should also be noted that the computer system here that processes the interaction information may also be a participating terminal running the application program, or more particularly the first terminal.

The objects may refer to any virtual entity, unit, creature, or character in an application program, such as an online game, wherein the unit may have one or more functions and may be enabled to interact with other objects. For example, the unit may be a character (e.g. a virtual person) in a gaming program, wherein the character may be able to perform interactions, such as collisions and conversations with other characters or objects. In the current invention, the collisions between the objects may be used as examples to demonstrate how the interaction information may be verified.

The application program, e.g. an online game, may be running on a number of terminals, which may be synchronized. In some embodiments, the interacting objects may all be controlled by the first terminal. In some embodiments, only one or some of the interacting objects may be controlled by the first terminal. In some embodiments, none of the interacting objects are controlled by the first terminal. The first terminal is the terminal that conducts the initial calculation, obtains the interaction information, and sends the interaction information to the computer system.

The interaction information may include a number of informational items, wherein some of the information items may be verified. The interaction information may include identity information of the first terminal, the application program (e.g. gaming application), and the objects that perform the interaction, e.g. a collision. The identify information may be in any form, such as but not limited to serial numbers, computer-readable codes, and ID tags. The interaction information may also include information related to the interaction, such as but not limited to: the time and format of the interaction, how the interactions should be displayed, and the expected effects of the interaction. For example, the interaction information may indicate that character A hit character B at a particular position, at a particular time, in the gaming application running on the first terminal, and that character B should be knocked to the ground. The interaction information may also include a credit rating associated with the first terminal, wherein the credit rating reflects how likely the first terminal may be correct regarding the specifics of the interaction, e.g. a collision.

Referring to FIG. 4, step 402 shows that the computer system may determine a credit rating associated with the first terminal. In particular, as shown in FIG. 1, the determining module 102 may be configured to determine the credit rating associated with the first terminal.

The credit rating may reflect how trustworthy the first terminal may be regarding the interaction information. In general, it is possible that the interaction information transferred from the first terminal is correct or not correct, wherein when the incorrect interaction information makes the gaming application difficult to control and generates possible security risks. Thus, in some embodiments, the computer system may verify the interaction information to ensure smooth and actuate operation of the application program, e.g. the online gaming application. However, as indicated above, if all the verification are performed by the computer system, the burden on the computing capability may sometimes affect the operation. In some embodiments of the current invention, the particular verification process depends on how trustworthy the first terminal is in regard to the interaction information.

The credit rating of the first terminal may depend on one or more of a number of factors, such as but not limited to: the computing power, e.g. CPU speed, of the first terminal, the memory size of the first terminal, the reliability of the network connecting the first terminal to the computer system, and/or the historic record of the first terminal related to the accuracy of the interaction information. Each terminal may have its own credit rating. The computer system may calculate the credit value for the terminals each time the terminal is used for verification. Alternatively, the credit rating may be set at default value and be adjusted after each verification.

Referring to FIG. 4, steps 403, 404, and 405 summarize how the interaction information may be verified. In some embodiments, according to step 403, the computer system may determine whether the credit rating exceeds a threshold. If the credit rating exceeds the threshold, the computer system may conduct step 404 and send the interaction information to a second terminal for verifying the interaction information. If the credit rating does not exceed the threshold, the computer system may conduct step 405, which involves broadcasting the interaction information to other terminals, conducting further verification based on certain conditions, and/or adjust the credit rating if needed.

The second terminal may be another terminal that is running the same application program, e.g. the gaming application, as the first terminal. Alternatively, the second terminal may be a terminal that is not running the application program, wherein the second terminal is used only for the verification of the interaction information from the first terminal.

The threshold for the credit rating may be set by the application program automatically or by the user. The threshold may reflect how stringent the verification process may be conducted. It should be noted that the general goal of steps 402 and 403 in FIG. 4 is to set a criterion to determine the level of trustworthiness of the first terminal in obtaining the interaction information, wherein the higher the threshold, the more likely that the interaction information is to be verified by a second terminal. In addition, this determination process may use other criteria for the same purpose, instead of a credit rating/threshold system. Such criteria may be considered a first set of conditions, wherein when the first set of conditions are satisfied, the computer system conducts a first set of verifications, e.g. step 404, and when the first set of conditions are not satisfied, the computer system conducts a second set of verifications, e.g. step 405.

Figure 5:
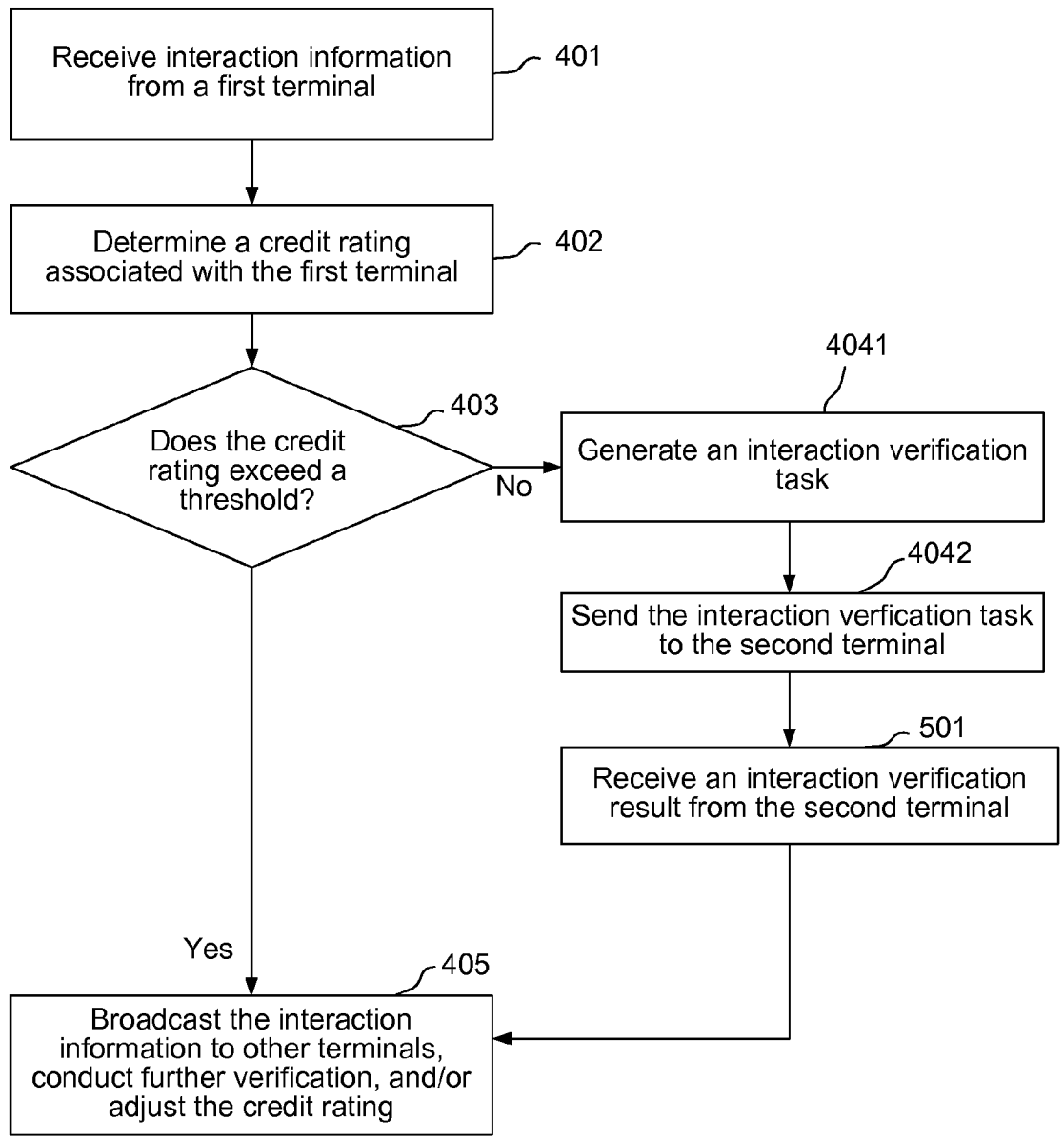
FIG. 5 is a flowchart illustrative of a method to process interaction information by a computer system in accordance with some embodiments of the current invention, providing more details for the verification process.

FIG. 5 is a flowchart illustrative of a method to process interaction information by a computer system in accordance with some embodiments of the current invention, providing more details for the verification process.

Referring to FIG. 5, steps 4041 and 4042 show that the computer system may generate an interaction verification task and send the interaction verification task to a second terminal. The interaction verification task may include a number of information items, such as but not limited to the interaction information, a request to the second terminal to verify the interaction information, and the identities of the interacting objects, the first terminal, the application program, and the computer system, and instructions regarding how to send a response back. In some embodiments, the second terminal may conduct further calculation, verify the interaction information, confirm or deny that the interaction information is accurate, and send a response back to the computer system.

When the credit rating does not exceed the threshold, as shown in steps 403 and 404 of FIG. 4, the computer system determines that the first terminal is not trustworthy enough to remove the necessity of further verification. Thus, in such cases, the computer system invariably verifies the interaction information and uses steps 4041 and 4042 to send the interaction information to the second terminal for verification. In some embodiments, the second terminal does not control any of the interacting objects, making the second terminal an objective party in deciding whether the interaction information is correct. In some embodiments, the computer system may only use terminals that are trustworthy—having high credit ratings—to conduct the verification. For example, the computer system may only send the interaction verification task to the second terminal when the credit rating associated with the second terminal exceeds a second threshold. It should also be noted that there may be multiple verifying terminals. For example, the computer system may send the verification task to both a second terminal and a third terminal; and the computer system may only consider the interaction information to be confirmed when both the verifying terminals return positive results. In some embodiments, the computer system may use three or more verifying terminals; and the computer system may consider the interaction information to be confirmed when a majority of the verifying terminals return positive results.

Figure 2:
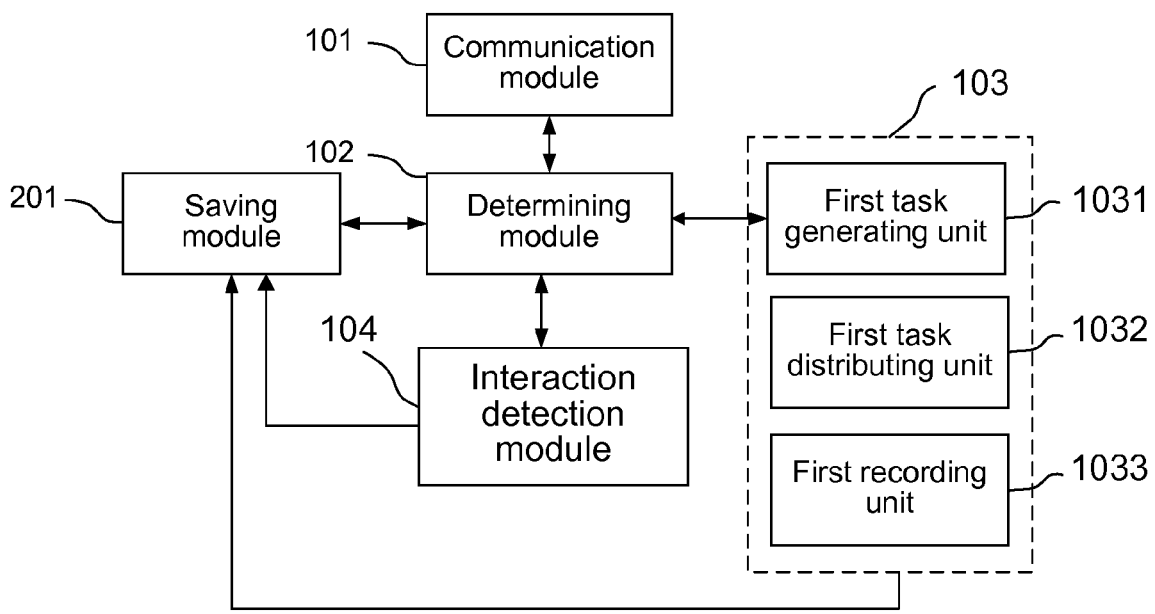
FIG. 2 is a block diagram illustrative of a computer system comprising modules configured to process interaction information in accordance with some embodiments of the current invention, providing more details for the modules.

Referring to FIG. 5, step 501 shows that the computer system may receive an interaction verification result from the second terminal. The result may confirm or deny the interaction information, causing the computer system to take further actions. In some cases, as described below, the credit ratings of the terminals (e.g., the first terminal) may be adjusted. As shown in FIG. 2, the saving module 201 may be configured to store the credit ratings. The determining module 102 may be configured to obtain the credit ratings of the terminals, e.g. the first terminal, from the saving module 201, when the communication module 101 receives the interaction information.

Figure 6:
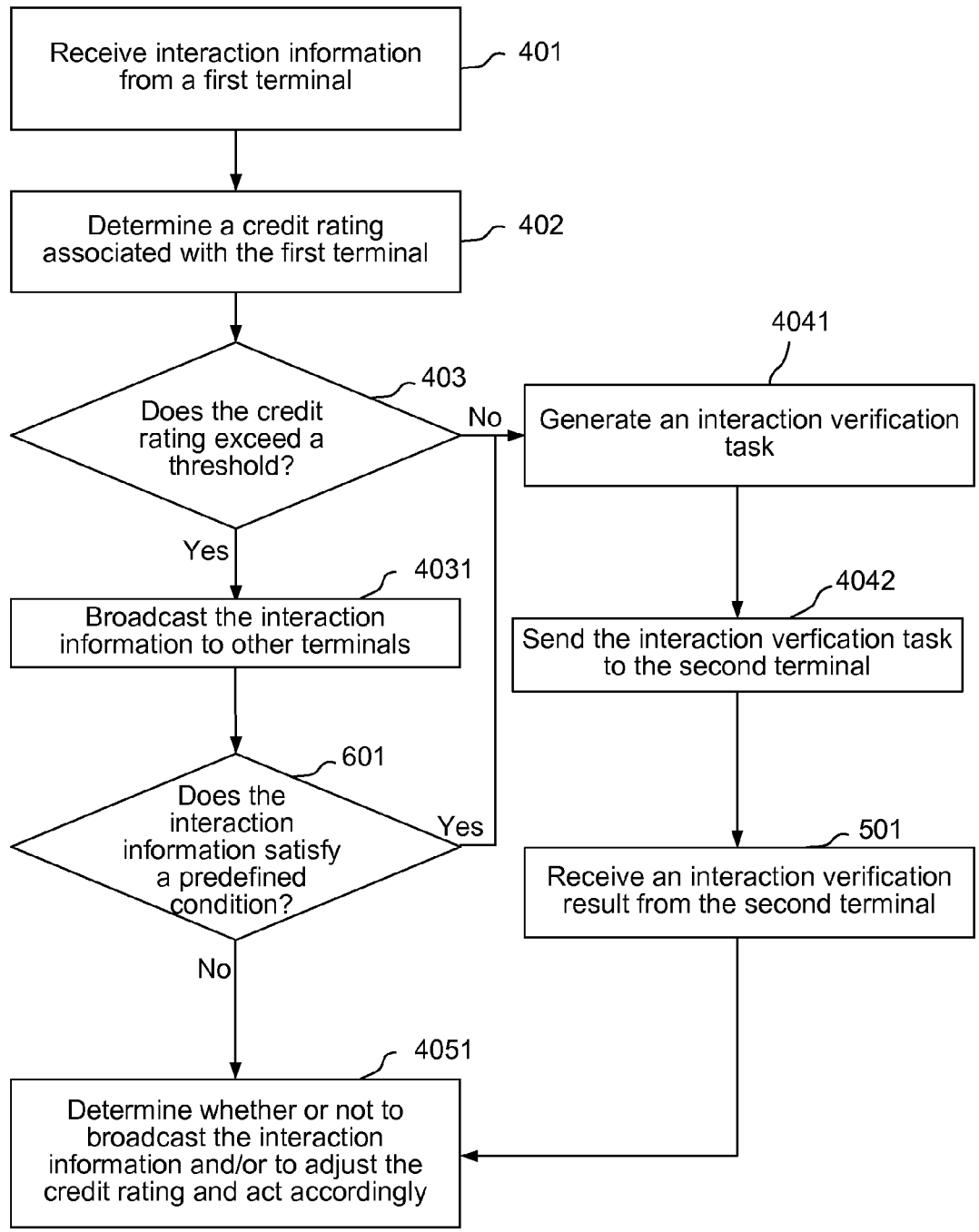
FIG. 6 is a flowchart illustrative of a method to process interaction information by a computer system in accordance with some embodiments of the current invention, providing more details for the verification process.
Figure 7:
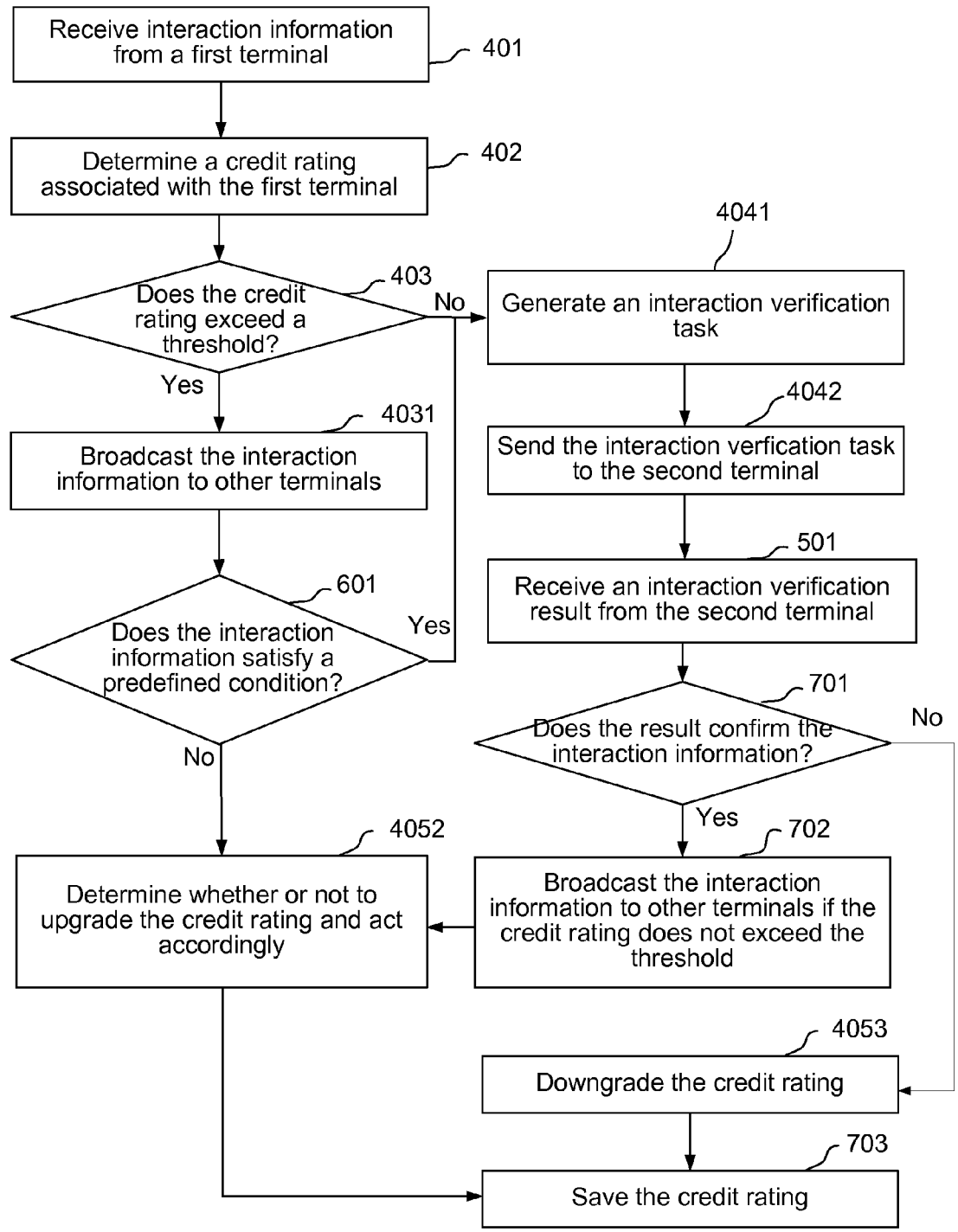
FIG. 7 is a flowchart illustrative of a method to process interaction information by a computer system in accordance with some embodiments of the current invention, providing more details for the verification process.

FIG. 6 is a flowchart illustrative of a method to process interaction information by a computer system in accordance with some embodiments of the current invention, providing more details for the verification process when the credit rating exceeds a threshold. FIG. 7 is a flowchart illustrative of a method to process interaction information by a computer system in accordance with some embodiments of the current invention, providing more details for the entire verification process.

Referring to FIG. 6, in some embodiments, when it is determined that the credit rating exceeds a threshold, the computer system proceeds to step 4031 and broadcasts the interaction information to other terminals running the application. Since the credit rating already indicates that the first terminal is trustworthy, the computer system only needs to conduct the verification of the interaction information from the first terminal in some circumstance, which is shown in later steps. In addition, the computer system may conduct the verification after or at the same time when the computer system broadcasts the interaction information. The security risks from such a broadcast-first/verify-second approach are limited because the first terminal has already been deemed dependable. If the interaction information that is chosen to be verified in the following steps cannot be confirmed by the second terminal, the credit rating of the first terminal may be decreased and the future interaction information from the first terminal may be subjected to indiscriminating verification.

Referring to FIG. 6, step 601 shows that when the credit rating exceeds the threshold (step 403), the computer system may still examine whether the interaction information satisfies a predefined condition. If the predefined condition is satisfied, the computer system may send the interaction information to a verification process. In some embodiments, the verification process includes the same steps when the credit rating does not exceed the threshold, as shown in FIG. 5.

The predefined condition may comprise a random selection process. For example, the computer system may assign a random number to the interaction information, wherein the condition is that the random number is higher than a predefined number. Other randomization techniques may also be used. In essence, such an approach allows the computer system to randomly choose when to verify the interaction information from the first terminal. It should also be noted that the predefined condition may be any condition that may provide a definitive result as to whether the interaction information should be verified and there is no requirement that a random selection process is involved. In some embodiments, the predefined condition may be related to the credit rating—e.g. a reverse correlation, wherein the higher the credit rating, the less likely the interaction information will be verified, and the lower the credit rating, the more likely the interaction information will be verified. In some embodiments, the predefined condition may be a condition that is always satisfied. Such an approach ensures that all the interaction information is verified. The computer system and/or the user may set the predefined condition.

Referring to FIG. 6, in some embodiments, step 4051 shows that the computer system may determine whether or not to broadcast the interaction information and/or to adjust the credit rating and act accordingly.

In FIG. 7, the steps 401, 402, 403, 4041, 4042, 501, and 4031 are the same as described in FIGS. 4-6. Step 701 shows that the computer system may determine whether the interaction verification results from the second terminal confirms the interaction information. When the interaction is a collision, such an inquiry may include examining whether the collision actually takes place and whether the parameters associated with the collision are accurate. If the interaction is confirmed, the computer system may broadcast the interaction information to other terminals if the credit rating does not exceed the threshold, as shown in step 702.

If the computer system goes through steps 403, 4041, 4042, 501, and 701 to confirm the interaction information, the computer system may broadcast the interaction information in step 702. The presence of the condition "credit rating not exceeding threshold" in step 702 serves as a filter for such cases. This means that if the computer system goes through steps 601, 4041, 4042, 501, and 701 to confirm the interaction information, in some embodiments, there is no need to conduct step 702, which may cause re-broadcasting of the interaction information for a second time because the interaction information in such cases has already been broadcasted in step 4031. In these cases, the computer system may take no action or proceed to steps 4052 and 703.

Referring to FIG. 7, when the interaction verification result does not confirm the interaction information, the computer system may downgrade the credit rating associated with the first terminal, as shown by step 4053. In addition, the computer system may save the downgraded credit rating, as shown in step 703. When the result confirms the interaction information, the computer system may also upgrade the credit rating, as shown by step 4052. Similarly, the computer system may save the upgraded or unchanged credit rating, as shown in step 703. In some embodiments, the computer system may choose to take no action and do not upgrade the credit rating. In general, the adjustments of the credit rating allow the computer system to more effectively evaluate how trustworthy the terminals may be regarding the interaction information. In the next round of interaction verification/broadcasting, the computer system may choose what kind of verification is necessary based on the adjusted credit ratings.

FIGS. 1-3 and 8 illustrate the computer system that may be used to perform the methods described in FIGS. 4-7. To avoid redundancy, not all the details and variations described for the method are herein included for the computer system. Such details and variations should be considered included for the description of the devices as long as they are not in direct contradiction to the specific description provided for the methods.

Referring to FIG. 1, in some embodiments: the communication module 101 may be configured to receive interaction information from the first terminal, wherein the interaction information is generated from an interaction of objects in a gaming application running on the first terminal; the determining module 102 may be configured to determine a credit rating associated with the first terminal. In addition, as shown in FIG. 1, if the credit rating associated with the first terminal exceeds a threshold: the interaction detection module 104 may be configured to broadcast the interaction information to other terminals running the gaming application, and if the interaction information satisfies a predefined condition, send the interaction information to a second terminal for verifying the interaction information and downgrade the credit rating associated with the first terminal if the interaction information is not confirmed by the second terminal. Moreover, in some embodiments, if the credit rating associated with the first terminal does not exceed the threshold: the data processing module 103 may be configured to send the interaction information to the second terminal for verifying the interaction information, if the interaction information is confirmed by the second terminal, broadcast the interaction information to the other terminals, and if the interaction information is not confirmed by the second terminal, downgrade the credit rating associated with the first terminal.

FIG. 2 is a block diagram illustrative of a computer system comprising modules configured to process interaction information in accordance with some embodiments of the current invention, showing the units of the data processing module 103 and a saving module 201, in addition to the modules illustrated in FIG. 1. As shown in FIG. 2, the data processing module 103 may comprise a first task generating unit 1031, a first task distributing unit 1032, and a first recording unit 1033, wherein the first task generating unit 1031 may be configured to generate the interaction verification task sent from the data processing module 103, the first task distributing unit 1032 may be configured to send the interaction verification task to the second terminal from the data processing module 103, and the first recording unit 1033 may be configured to adjust the credit rating associated with the first terminal. The saving module 201 may be configured to save the adjusted credit ratings, which may be used by the determination module 102 in the next round of interaction information verification.

Figure 3:
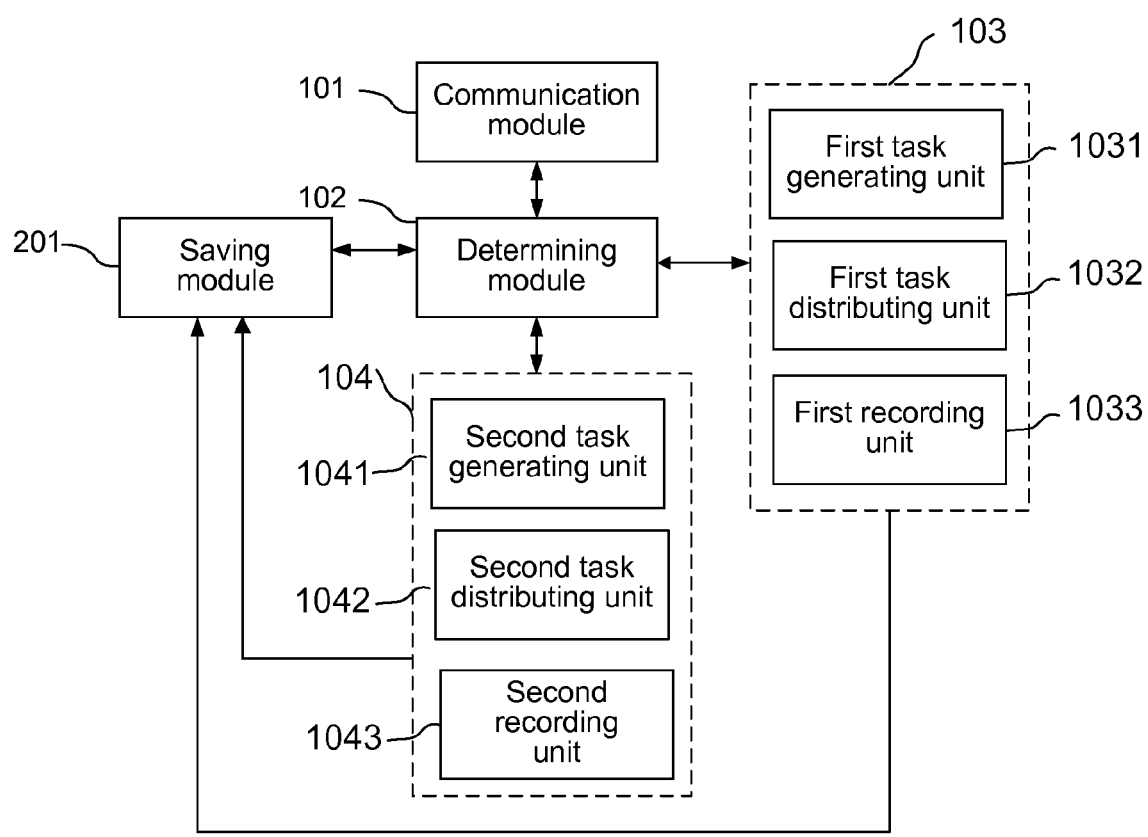
FIG. 3 is a block diagram illustrative of a computer system comprising modules configured to process interaction information in accordance with some embodiments of the current invention, providing more details for the modules.

FIG. 3 is a block diagram illustrative of a computer system comprising modules configured to process interaction information in accordance with some embodiments of the current invention, providing more details for the interaction detection module 104 and showing a recording module in addition to the modules illustrated in FIG. 2. As shown in FIG. 3, the interaction detection module 104 may comprise a second task generating unit 1041, a second task distributing unit 1042, and a second recording unit 1043, wherein the second task generating unit 1041 may be configured to generate the interaction verification task sent from the interaction detection module 104, the second task distributing unit 1042 may be configured to send the interaction verification task to the second terminal from the interaction detection module 104, and the second recording unit 1043 may be configured to adjust the credit rating associated with the second terminal. The saving module 201 may be configured to save the adjusted credit ratings, which may be used by the determination module 102 in the next round of interaction information verification.

Figure 8:
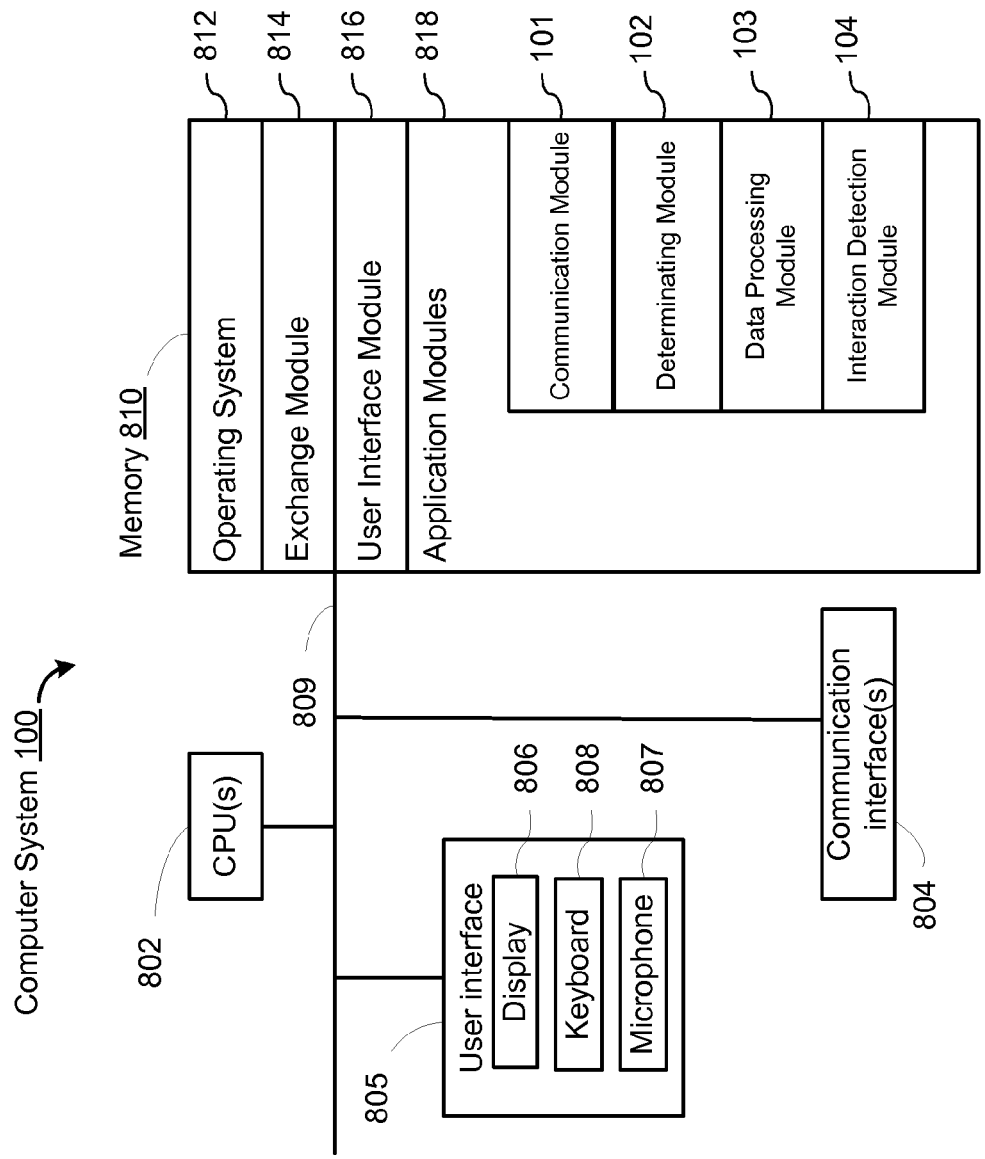
FIG. 8 is a block diagram of a computer system in accordance with some embodiments of the current invention.

FIG. 8 is a block diagram of a computer system in accordance with some embodiments of the current invention. The exemplary computer system 100 typically includes one or more processing units (CPU's) 802, one or more network or other communications interfaces 804, memory 810, and one or more communication buses 809 for interconnecting these components. The communication buses 809 may include circuitry (sometimes called a chipset) that interconnects and controls communications between system components. The computer system 100 may include a user interface 805, for instance, a display 806, a keyboard 808, and a microphone 807. When the computer system 100 is a smart phone or tablet, the user interface 805 may include a touch screen, which is both a display and an input device. Memory 810 may include high speed random access memory and may also include non-volatile memory, such as one or more magnetic disk storage devices. Memory 810 may include mass storage that is remotely located from the CPU's 802. In some embodiments, memory 810 stores the following programs, modules and data structures, or a subset or superset thereof:

an operating system 812 that includes procedures for handling various basic system services and for performing hardware dependent tasks;

a network exchange module 814 that is used for connecting the computer system 100 to the terminals, and/or other computers via one or more communication networks (wired or wireless), such as the Internet, other wide area networks, local area networks, metropolitan area networks, and so on;

a user interface module 816 configured to receive user inputs through the user interface 805;

and a number of application modules 818 including the following:

a communication module 101 may be configured to receive interaction information from the first terminal, wherein the interaction information is generated from an interaction of objects in a gaming application running on the first terminal;

a determining module 102 may be configured to determine a credit rating associated with the first terminal;

an interaction detection module 103 configured to: if the credit rating associated with the first terminal exceeds a threshold: broadcast the interaction information to other terminals running the gaming application, and if the interaction information satisfies a predefined condition, send the interaction information to a second terminal for verifying the interaction information and downgrade the credit rating associated with the first terminal if the interaction information is not confirmed by the second terminal; and a data processing module 104 configured to: if the credit rating associated with the first terminal does not exceed the threshold: send the interaction information to the second terminal for verifying the interaction information, if the interaction information is confirmed by the second terminal, broadcast the interaction information to the other terminals, and if the interaction information is not confirmed by the second terminal, downgrade the credit rating associated with the first terminal.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing interaction detection, the method comprising:
   at a computer system having one or more processors and memory storing programs executed by the one or more processors,
      receiving interaction information from a first terminal, wherein the interaction information is generated from an interaction of objects in a gaming application running on the first terminal;
      determining a credit rating associated with the first terminal;
      if the credit rating associated with the first terminal exceeds a threshold:
         broadcasting the interaction information to other terminals running the gaming application; and
         if the interaction information satisfies a predefined condition:
            sending the interaction information to a second terminal for verifying the interaction information and downgrading the credit rating associated with the first terminal if the interaction information is not confirmed by the second terminal;
      if the credit rating associated with the first terminal does not exceed the threshold:
         sending the interaction information to the second terminal for verifying the interaction information;
         if the interaction information is confirmed by the second terminal, broadcasting the interaction information to the other terminals; and
         if the interaction information is not confirmed by the second terminal, downgrading the credit rating associated with the first terminal.

2. The method of claim 1, wherein:
the interaction is a collision between the objects.

3. The method of claim 1, wherein:
the predefined condition comprises a randomized selection process.

4. The method of claim 1, further comprising:
sending the interaction information to a third terminal for verifying the interaction information if the credit rating associated with the first terminal does not exceed the threshold.

5. The method of claim 4, wherein:
the interaction information is broadcasted to the other terminals if the interaction information is confirmed by both the second terminal and the third terminal.

6. The method of claim 1, wherein:
the second terminal has a second credit rating exceeding a second threshold.

7. The method of claim 1, further comprising:
saving the credit rating associated with the first terminal if the credit rating is downgraded.

8. The method of claim 1, wherein:
the interaction information includes identity information of the objects.

9. A computer system comprising:
one or more processors;
memory; and
one or more programs modules stored in the memory and configured for execution by the one or more processors, the one or more program modules including:
   a communication module configured to receive interaction information from a first terminal, wherein the interaction information is generated from an interaction of objects in a gaming application running on the first terminal;
   a determining module configured to determine a credit rating associated with the first terminal;
   an interaction detection module configured to:
      if the credit rating associated with the first terminal exceeds a threshold:
         broadcast the interaction information to other terminals running the gaming application, and
         if the interaction information satisfies a predefined condition, send the interaction information to a second terminal for verifying the interaction information and downgrade the credit rating associated with the first terminal if the interaction information is not confirmed by the second terminal; and
   a data processing module configured to:
      if the credit rating associated with the first terminal does not exceed the threshold:
         send the interaction information to the second terminal for verifying the interaction information;
         if the interaction information is confirmed by the second terminal, broadcast the interaction information to the other terminals; and
         if the interaction information is not confirmed by the second terminal, downgrade the credit rating associated with the first terminal.

10. The computer system of claim 9, wherein:
the interaction is a collision between the objects.

11. The computer system of claim 9, wherein:
the predefined condition comprises a randomized selection process.

12. The computer system of claim 9, wherein the data processing module is further configured to:

send the interaction information to a third terminal for verifying the interaction information if the credit rating associated with the first terminal does not exceed the threshold.

13. The computer system of claim 12, wherein:
the interaction information is broadcasted to the other terminals if the interaction information is confirmed by both the second terminal and the third terminal.

14. The computer system of claim 9, wherein:
the second terminal has a second credit rating exceeding a second threshold.

15. The computer system of claim 9, further comprising:
a saving module configured to save the credit rating associated with the first terminal if the credit rating is downgraded.

16. The computer system of claim 9, wherein:
the interaction information includes identity information of the objects.

17. A non-transitory computer readable storage medium having stored therein one or more instructions, which, when executed by a computer system, cause the computer system to:
receive interaction information from a first terminal, wherein the interaction information is generated from an interaction of objects in a gaming application running on the first terminal;
determine a credit rating associated with the first terminal;
if the credit rating associated with the first terminal exceeds a threshold:
broadcast the interaction information to other terminals running the gaming application; and
if the interaction information satisfies a predefined condition:
send the interaction information to a second terminal for verifying the interaction information and downgrade the credit rating associated with the first terminal if the interaction information is not confirmed by the second terminal;
if the credit rating associated with the first terminal does not exceed the threshold:
send the interaction information to the second terminal for verifying the interaction information;
if the interaction information is confirmed by the second terminal, broadcast the interaction information to the other terminals; and
if the interaction information is not confirmed by the second terminal, downgrade the credit rating associated with the first terminal.

18. The non-transitory computer readable storage medium of claim 17, wherein:
the interaction is a collision between the objects.

19. The non-transitory computer readable storage medium of claim 17, wherein:
the predefined condition comprises a randomized selection process.

20. The non-transitory computer readable storage medium of claim 17, wherein the instructions further cause the computer system to:
send the interaction information to a third terminal for verifying the interaction information if the credit rating associated with the first terminal does not exceed the threshold.

* * * * *